United States Patent [19]

Pieper

[11] Patent Number: 5,744,189
[45] Date of Patent: Apr. 28, 1998

[54] METHOD OF ENSILING FODDER

[76] Inventor: Bernd Pieper, Dorfstrasse 34, 16818 Wuthenow, Germany

[21] Appl. No.: 513,892

[22] PCT Filed: Feb. 18, 1994

[86] PCT No.: PCT/EP94/00478

§ 371 Date: Nov. 13, 1995

§ 102(e) Date: Nov. 13, 1995

[87] PCT Pub. No.: WO94/18847

PCT Pub. Date: Sep. 1, 1994

[30] Foreign Application Priority Data

Feb. 24, 1993 [DE] Germany .......................... 43 05 683.5

[51] Int. Cl.⁶ .......................................... A23K 3/03
[52] U.S. Cl. .............................. 426/636; 426/49; 426/52; 426/53; 426/54; 426/61; 426/418; 426/419
[58] Field of Search ........................... 426/636, 61, 49, 426/52, 53, 54, 418, 419

[56] References Cited

FOREIGN PATENT DOCUMENTS 281255  8/1990  Germany .

OTHER PUBLICATIONS

JP, A, 57016661, Abstract only, JP Abstracts, vol. 6, No. 85, (May, 1982).

*Primary Examiner*—David L. Lacey
*Assistant Examiner*—Choon P. Koh
*Attorney, Agent, or Firm*—Wood, Herron & Evans, L.L.P.

[57] ABSTRACT

The invention relates to a method of ensiling fodder made by combining fresh or wilted silage material with solid carbon dioxide while utilizing the essential conditions for homofermentative lactic acid fermentation, which are known in themselves and the basic parameters of which can be monitored. The solid carbon dioxide is added in an amount of 0.5 to 20 kg per ton, preferably 1 to 3 kg per ton, according to a principle of distribution that gives priority to the zones of the silo most endangered by oxygen in the air, in particular the marginal zones. The fermentation process must take place with an amount of silage material large enough to be little affected by the ambient temperature.

20 Claims, 2 Drawing Sheets

METHOD OF ENSILING FODDER

DESCRIPTION

The object of the invention is to develop a method of ensiling fermentable agricultural materials intended primarily for animal fodder, in which preservation is achieved mainly by lactic acid produced by lactic acid bacteria in the silage material.

The requirements for adequate formation of lactic acids derive from the living conditions required by the desired cold lactic acid bacteria. Among these requirements for life are sufficient fermentable carbohydrates, anaerobic conditions and relatively low temperatures. Fermentable carbohydrates, the oxygen content of the air and the temperature are closely interrelated. The process of oxidation of fermentable carbohydrates by aerobic microorganisms and by plant parts that have not yet died, which involves large losses, causes an increase in temperature which in turn worsens the living conditions for cold lactic acid bacteria and improves those of deleterious organisms. The method in accordance with the invention is intended to avoid these disadvantages.

For the successful production of good silage sufficient lactic acid must be formed as rapidly as possible, and the amount of lactic acid must remain sufficient as long as the silage is in storage. Therefore solid carbon dioxide is employed as an additive to the silage, so that in combination with sufficient naturally present or added lactic acid bacteria and sufficient fermentable carbohydrates, which may be naturally present or added, fermentation in an amount of silage large enough to be little affected by the ambient temperature will proceed in such a way that sufficient lactic acid is formed with little loss of silage. The method produces silage of high quality with little loss of silage, by a method that is environmentally benign.

The invention relates to a method of ensiling fermentable agricultural products intended primarily for animal fodder. The purpose of ensilage is to preserve fermentable agricultural products, mainly by means of lactic acid, which is produced by lactic acid bacteria in the material to be converted to silage. As is well known, various actions are ascribed to the lactic acid in this process. Chief among these are the reduction of pH, a bactericidal or bacteriostatic effect of the acid residue, and an antibiotic-like action.

For the successful production of silage, sufficient lactic acid must be formed as rapidly as possible, and the lactic acid must continue to be present in sufficient amounts as long as the silage is stored.

All measures that assist the formation and continued presence of lactic acid are to be promoted, and whatever counteracts this should be avoided or prevented. If this principle is followed consistently, organisms deleterious to silage cannot develop.

The requirements for adequate formation of lactic acid are derivable from the conditions the desired cold lactic acid bacteria need in order to live. Among these necessities for life are sufficient fermentable carbohydrates, anaerobic surroundings and relatively low temperatures. Fermentable carbohydrates, the oxygen content of the air and the temperature are closely interrelated. Under the action of oxygen in the air fermentable carbohydrates, in particular sugar, such as molasses are oxidized by those parts of plants that have not yet died and by aerobic microorganisms. This process, which involves large losses, causes an increase in temperature which in turn makes the environment less favorable for cold lactic acid bacteria and more favorable for the deleterious organisms. The warm conditions persist until the oxygen in the air within the silage has been used up or expelled. Furthermore, temperature affects gas exchange in such a way that the exchange of gases, and hence the replenishment of oxygen within the silage, is facilitated at higher temperatures. As a result, in many cases so much of the available sugar can be consumed by these processes that not enough is left for the required production of lactic acid. Hence the necessary lowering of pH in the silage does not occur, and butyric acid is formed.

In most cases, the success or failure of the silage-making procedure is decided when the plant materials are first put into storage. It is therefore of crucial importance that the oxygen in the air within the silage material be eliminated as rapidly and completely as possible. It is known that aerial oxygen can be rapidly displaced from the silage material by means of solid carbon dioxide. Solid carbon dioxide, commercially known as "dry ice", changes to the gaseous form within the silage, leaving no residue. The carbon dioxide pressure that thus develops in the silage drives off the aerial oxygen. At the same time, the temperature falls and there is an associated reduction of gas exchange.

A number of authors, such as SLOOF, A. "Werkwijze voor het ensileere (inkuilen) van groenvoeder" NL-PS Octrooi No. 57466, 1945; DIJKSTRA, N. D. "Proefnemingen over ensileren met vast koolzuur" Verslagen van Landbouwkundige Onderzoekingen, No. 55.5, 1949; DIJKSTRA, N. D. "Proefnemingen over ensileren met koolzuur" Verslagen van Landbouwkundige Onderzoekingen, No. 57.10, 1951; HAENDLER, H. "Making silage from pulped Lucerne with added $CO_2$," kiserl. közl. Ser. B., 1967, 59, No. 1, have described experiments in the past in which carbon dioxide was employed in solid or gaseous form. The results achieved have shown that many such experiments failed, or the effect theoretically expected did not in fact occur. From these apparently very indifferent results has arisen the currently prevailing opinion about the use of solid carbon dioxide, namely that if the technical recommendations regarding the conditions for silage and the preceding mechanical treatment of the silage material are followed, the addition of solid carbon dioxide is nearly ineffective (KNABE, O.; FECHNER, M. U.; WEISE, G. "Verfahren der Silageproduktion" VEB Deutscher Landwirtschaftsverlag, Berlin 1986, pp. 50 and 63; WOOLFORD, M. K. "The Silage Fermentation" Marcel Decker Incorporated, New York 1984, p. 253).

There are various reasons for the lack of clear success in the past experiments on the use of solid carbon dioxide. The failures can be explained by the following: that care was not taken to ensure the presence of homofermentative lactic acid bacteria in the silage material, that the benefit of solid carbon dioxide was tested primarily with silage materials that are very difficult to ferment, that the addition of solid carbon dioxide was often not appropriately combined with the so-called wilting procedure, and that the trials were carried out in fermentation containers that were much too small and irrelevant to agricultural practice. The last of these conditions masks the actual interactions between the temperature development in a large silo, the breakdown of nutrients and the gas exchange between the fodder mass and the atmosphere.

The concepts "number of homofermentative effective lactic acid bacteria" and "fermentable carbohydrates" are still subjects of scientific research and cannot yet be unequivocally defined quantitatively or qualitatively. For practical purposes, a simple test according to PIEPER et al., 1990 (Patent DD 281 255 - GO 1N 327 365 1) allows sufficiently precise information to be obtained about the fermentability of silage materials. It provides data regarding:

1. The degree to which effective lactic acid bacteria are naturally present in the silage materials.
2. The suitability of commercial preparations of lactic acid bacteria for the particular silage material concerned.
3. The silage material's natural content of substances that can be fermented to form lactic acid.
4. The suitability of silage additives as a source of nutrition for the lactic acid bacteria naturally present or to be added.
5. The acid tolerance of the lactic acid bacteria naturally present or to be added.

The essential prerequisites for an adequate formation of lactic acid—that is, a dry-matter-dependent reduction of pH—can thus be monitored. In general, as long as what is learned from the results obtained with the method is taken into account, a silage with good fermentation-biological characteristics can be prepared. The measures that must be taken in this regard correspond to the present state of the art. What is new here is that the quality of the silage can be further improved and the losses reduced by employing solid carbon dioxide. In addition to solid carbon dioxide, fermentable carbohydrates such as molasses can be added in an amount of 1 to 30 kg per ton, as well as enzymes or enzyme complexes to facilitate the fermentation reaction by providing enzymes and substrates for the lactic acid bacteria.

It is understood in the current state of the art that in the course of the natural processes which are unavoidable in silage-making, several times more carbon dioxide is formed than is added in solid form in accordance with the present invention. Therefore the addition of solid carbon dioxide is thought to be extremely ineffective. In the proposal to add solid carbon dioxide during silage production, the natural carbon-dioxide-generating events are not overlooked. However, it is taken as a point of departure that the carbon-dioxide-generating process itself is of crucial significance to the extent and time course of chemical reactions during preservation. In the natural events associated with silage production, carbon dioxide is generated by processes in which energy is released. The ambient temperature is increased. When solid carbon dioxide is present, carbon dioxide derives from a process in which energy is consumed. The ambient temperature is reduced. As a result, the characteristics of the carbon dioxide differ with respect to gas exchange with the surroundings. The higher the temperature, the more intensive is the gas exchange, including the invasion of the silo by oxygen from the outside air. A self-accelerating process can come into being, and can eventually set the silo on fire. In practice less extreme effects are more typical and often become visible at exposed surfaces within the silo in that the silage, even if it has good fermentation-biological properties, acquires a dark discoloration in the marginal zones.

It is the object of the present invention to develop a method of ensiling fodder in which the addition of solid carbon dioxide, in combination with sufficient naturally present or added lactic acid bacteria and sufficient fermentable carbohydrates, such as molasses in an amount of 1 to 30 kg per ton, produces a high-quality silage with only slight losses. This object is achieved in accordance with the invention by the features described in claims 1 to 4.

Advantages

The advantages attainable with the invention are that the losses during fermentation are considerably decreased, nutrient losses resulting from aerobic reactions are greatly diminished, reduced digestibility as a result of heating of the silage material is avoided, faulty fermentation is prevented, so that animal products, in particular milk, do not acquire unpleasant odors or suffer a loss of quality, the aerobic stability of the silage so prepared is substantially improved, because in the initial phase of silage-making the development of aerobic bacteria, of yeasts, of mold fungi and of other deleterious aerobic organisms is very rapidly suppressed, preparation of silage in accordance with the invention minimizes the possibility of mycotoxin loading of the silage, the total amount of solid carbon dioxide to be added is very small and, accordingly, the method is very economical, the method is easy to carry out, overdosages are not harmful, and the method in accordance with the invention is environmentally friendly because a waste product ($CO_2$) is reused, in order to generate less waste.

By adding solid carbon dioxide during ensilage in accordance with the invention, aerobic processes are very effectively suppressed. In addition gas exchange, i.e. the reentry of oxygen from the air into the silage, is greatly reduced.

Solid carbon dioxide is therefore distributed through the silage material at the outset, as the silo is being filled, in such a way that cold carbon dioxide exerts its action particularly in the oxygen-endangered marginal and superficial zones. Corresponding distribution plans are shown in the application examples.

The decision as to the form in which the solid carbon dioxide is added can be based primarily on considerations of economy and technology. The solid carbon dioxide can be introduced in the form of blocks, slices, pellets, pieces or carbonic-acid snow, which is formed when liquid carbonic acid is released from pressure.

Temperature measurements have adequately confirmed the success of the procedure in accordance with the invention.

Although the employment of solid carbon dioxide in accordance with the invention does shift the limits for the essential prerequisites for silage-making, it is first and foremost a means by which silage that is good with respect to its fermentation biology can be made even better.

It should always be employed when objective or subjective risks to silage materials or silage due to oxygen in the air are present. This is almost always the case when material comprising abundant dry matter is concerned.

In combination with the method of PIEPER et al. (1990), which enables the decision about an effective addition of preparations of lactic acid bacteria and of substances that can be fermented to produce lactic acid, the positioning of solid carbon dioxide in the parts of a silo endangered by oxygen in the air is a cost-effective variant in the production of high-quality silage. The employment of solid carbon dioxide is also beneficial in the case of silage materials that are at present regarded as adequate for the production of good silage without the use of silage-making additives. Studies of maize rich in dry matter have confirmed this.

EXAMPLES OF APPLICATIONS

In the following the invention will be described in more detail with reference to exemplary applications.

Example 1

The action of dry ice in the preparation of wilted silage was investigated in a large-scale experiment.

Silage material was obtained from a first-cut stand of meadow grass, covering an area of 140 ha. The wilted grass was loaded simultaneously into two separate horizontal silos. It has an adequate complement of effective lactic acid bacteria as a result of the addition of a starter culture.

In one of the silos dry ice was added while the silo was being filled.

Two days before mowing the fermentability of the fodder had been determined by the method of Pieper et al., 1990 (Patent DD 281 255 - G01N 327 365 1). For this purpose samples were taken at 35 sites in the area, and 7 bulk samples were obtained by combining sets of 5 individual samples. The determination of fermentability is described in terms of the test of one of the 7 bulk samples, as follows.

The sample to be tested was finely comminuted and thoroughly mixed together. From this material 4 partial samples were taken, each weighing 50 g; these were put into beakers and an aqueous infusion was prepared with 200 ml water. Two of the 4 partial samples were inoculated with a commercially available culture of lactic acid bacteria with an inoculum density of 1×106 CFU/g FM[1]). Nothing was added to the two other partial samples. Then all partial samples were incubated at 35° C. The resulting acidification process was monitored by regular pH measurements.

Whereas for one partial sample with no addition and one inoculated partial sample only the time course of pH change was followed, the comparison partial sample in each case was treated with caustic soda to neutralize the acids formed by fermentation. The neutralization was repeated until no further acidification was observed (Table 1).

From the values in Table 1 it could be seen that the pH fell more rapidly in the partial sample to which lactic acid bacteria had been added, and reached significantly lower levels, than in the analogous comparison sample. It follows that the natural epiphytic organisms acidified the infusion more slowly than did the added culture of lactic acid bacteria and had a considerably lower acid tolerance.

The titrated amounts of caustic soda indicate on one hand that the added culture of lactic acid bacteria forms more lactic acid from the fermentable substances, and on the other hand that the content of substances that can be fermented into lactic acid is sufficient to produce good silage even when the fodder has wilt ed only slightly.

Tests of the remaining bulk samples led to the same conclusions.

It was therefore decided that the tested culture of lactic acid bacteria should be added when the test area was harvested. The culture was applied in liquid form as the wilted grass was chopped in the field. The inoculation density was 1×10$^6$ CFU/g FM.

Figure 1:
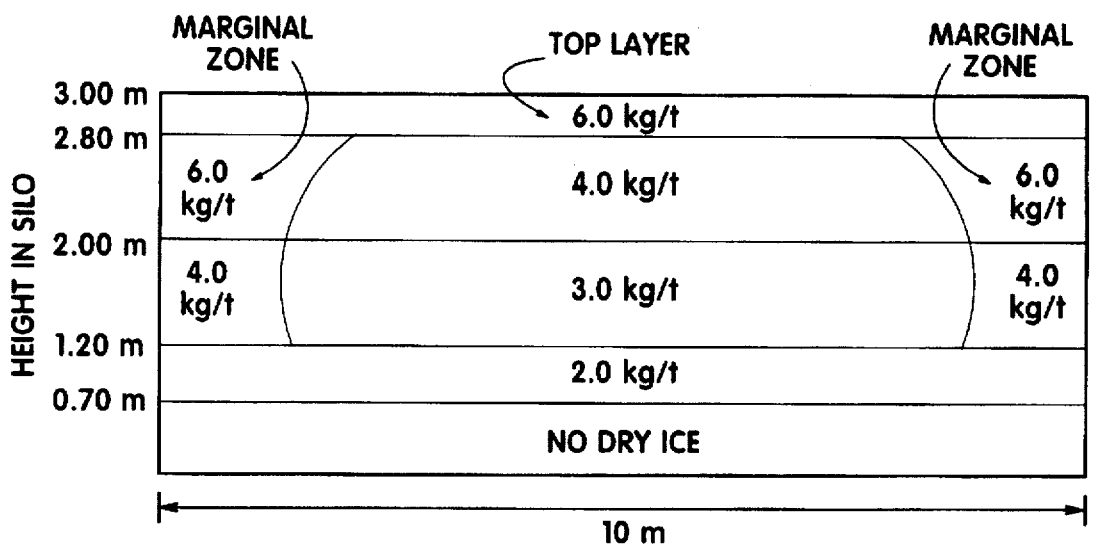
FIG. 1 shows the cross-sectional distribution of dry ice in a horizontal silo.

To produce the silage the grass was cut, allowed to wilt slightly, collected with a field chopper and chopped, transported to the horizontal silos, distributed and packed down by driving over it. The silage material had a mean dry-matter content of 58%. The horizontal silos were 50 m long, 10 m wide and 3 m high. The distribution of the added dry ice can be seen in FIG. 1. Blocks with a mass of 5 kg were used. Until the stack was 0.7 m high, no dry ice was added. To the layer from 0.7 m to 1.20 m in height, it was added in the proportion 2.0 kg/t silage material. From the height of 1.20 m to 2.0 m the amount of application was 3 kg/t except for the 1-m-wide marginal region, where it was 4.0 kg/t. From 2.0 m to 2.80 m in height 4.0 kg/t was applied, with 6.0 kg/t in the 1.5-m-wide marginal region.

Before the silo was covered over, dry ice was placed about 10–20 cm below the surface of the top layer at an amount of 1 kg/m$^2$ or in the marginal zones (up to 1.5 m away from the edge) 2 kg/m$^2$. For this addition pieces weighing 1 kg were used. The overall amount of application of dry ice was 3.2 kg/t.

Each silo was covered with a thin sheet. Over the entire surface of the sheet a layer of chaff ca. 20 cm thick was placed.

Figure 2:
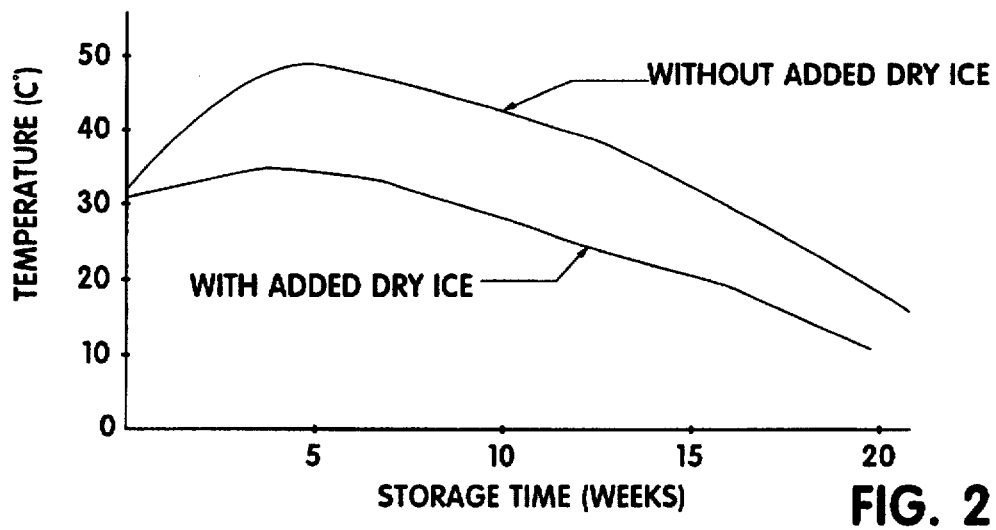
FIG. 2 is a plot of temperature variation during storage of wilted silage.

While the silage was in storage, the temperatures in both silos were measured (FIG. 2). As can be seen in FIG. 2, the two heaps of silage differed considerably in the temperatures they developed. Whereas in the treated silage only a slight rise in temperature was detected, substantial warming occurred in the untreated silage. The greatest difference, amounting to 16° C., was seen after 6 weeks of storage.

The effect of the heating on the digestibility of the organic matter was investigated by the cellulase method of Friedel and Poppe 1990 (K. Friedel and S. Poppe, 1990 "Ein modifiziertes Cellulaseverfahren als Methode zur Sch ätzung der Verdaulichkeit von Grobfutter", G 4—Bericht, Universität Rostock, Wissenschaftsbereich Tierernährung). It showed the digestibility of the organic matter to be 72% for the silage treated with dry ice and 68% for the untreated silage.

Both the differences in temperature development and the digestibility coefficients confirm that the properly managed employment of dry ice leads to substantially lower losses in the preparation of wilted silage.

1) CFU/g FM: colony-forming units per gram fresh mass

TABLE 1 pH change and consumption of caustic lye as a function of incubation time

| | Time (h) | | | | | | | | | | |
|---|---|---|---|---|---|---|---|---|---|---|---|
| | 0 | 10 | | 16 | | 22 | | 28 | | 34 | |
| | | | | | | Bacterial culture | | | | | |
| | pH | pH | NaOH 1 n ml | pH | NaOH 1 n ml | pH | NaOH 1 n ml | pH | NaOH 1 n ml | pH | NaOH 1 n ml | Tot. NaOH 1 n ml |
| Untreated | 6.0 | 5.4 | — | 5.0 | — | 4.8 | — | 4.5 | — | 4.5 | — | — |
| Treated + | 6.0 | 5.0 | — | 4.6 | — | 3.9 | — | 3.6 | — | 3.6 | — | — |
| Untreated | 6.0 | 5.4 | — | 5.0 | 3.1 | 5.1 | 2.7 | 5.0 | 3.0 | 6.0 | — | 8.8 |
| Treated + | 6.0 | 5.0 | — | 4.6 | 4.0 | 4.6 | 4.1 | 5.0 | 3.0 | 6.0 | — | 11.1 |

+ Inoculum density of $1 \times 10^6$ CFU/g FM

Example 2

Silo maize at the doughy stage of ripening, from three fields with a total area of 130 ha, was ensiled.

Three days before harvest the fermentability was determined by the method according to Patent DD 281 255 - G01N 327 365 1 (see Example 1). The green-fodder samples were obtained by means of a field chopper, with which swathes were mown through the fields. Two commercially available starter cultures were tested for the prospective maize ensilage.

The result of the fermentability test showed that the natural complement of epiphytes produces a very rapid lowering of the pH and has high acid tolerance, that the silage material contains a sufficient amount of fermentable substances and that fermentation would not be expected to improve appreciably if commercial starter cultures were added to the silage. Therefore the addition of starter cultures was omitted. The maize was cut and comminuted with a self-propelled field chopper. The silage was produced in a horizontal silo with solidified base plate, bounded at the sides and back by 5-m-high concrete walls.

The maize had an average dry-matter content of 37%. The silage material was loaded into the silo by a progressive stacking method in which the silage material was tipped out in front of the s tack, pushed up onto the slope of the stack being gradually formed from the back wall forward, by means of a front- or back-mounted push-off rake, and packed down by driving over it. The filled parts of the silo were covered with sheet material in stages, and the entire surface of each sheet was weighted down with a 20-cm-thick layer of chaff. During the filling process dry ice was added, in the form of slices with a mass of 2 kg. The distribution of the dry ice was such as to concentrate it in the oxygen-endangered zones of the silo, i.e. the marginal and upper layers and the upper regions of the sloping front of the stack.

Figure 3:
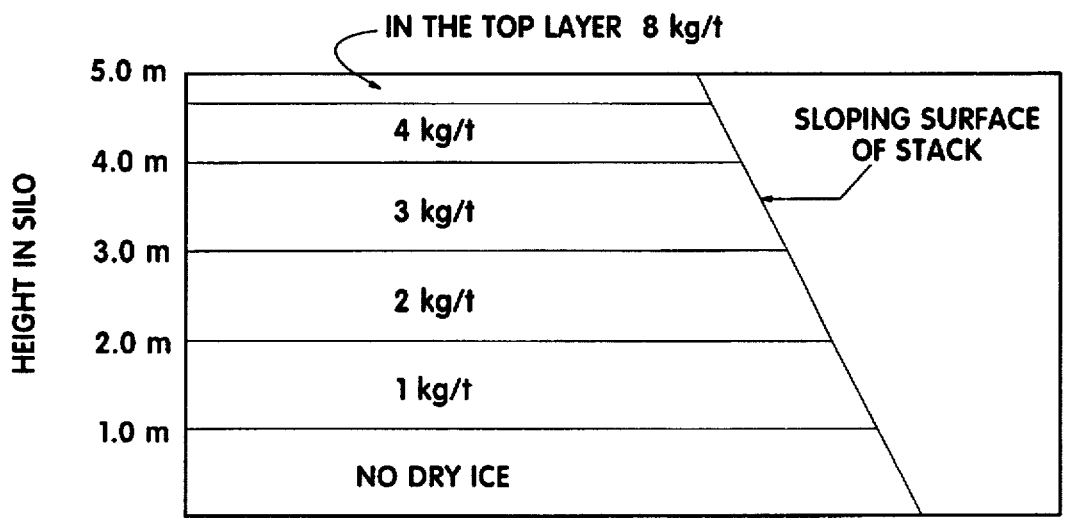
FIG. 3 shows the distribution of dry ice in a longitudinal section of a horizontal silo in which maize is progressively stacked.
Figure 4:
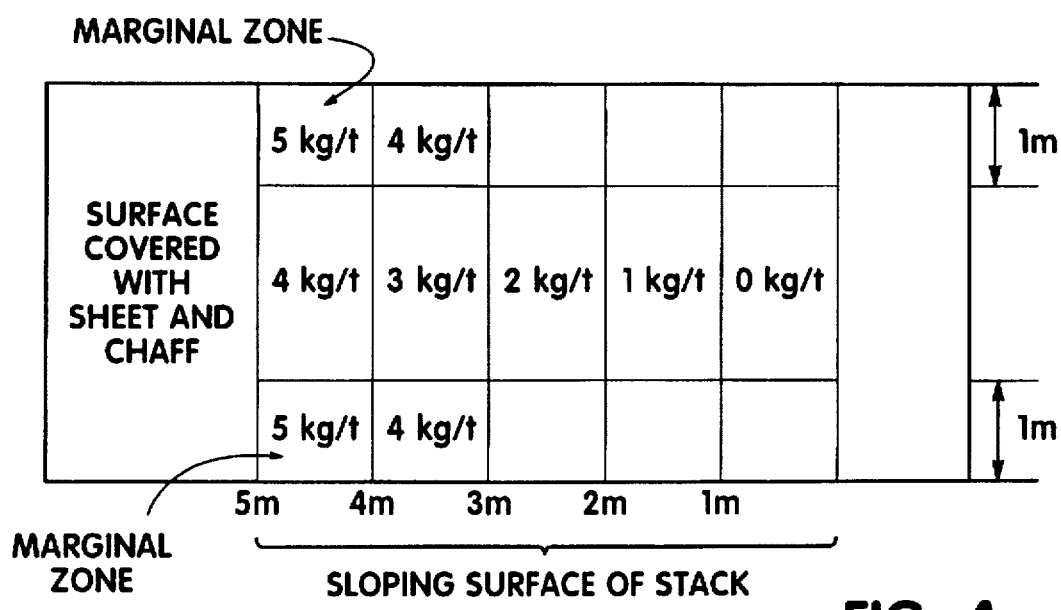
FIG. 4 shows a plan view of dry ice distribution in a horizontal silo in which maize is progressively stacked.

The amounts supplied in the various regions of the silo and the principle of distribution can be seen in FIGS. 3 and 4. The overall application amount was 2.9 kg of dry ice per t of silage material.

While the maize silage was in storage, the temperature in the stack was monitored. The highest temperatures, reaching 23° C., were recorded after 7 weeks. Temperature measurements in comparable silos (same harvest and stacking technology, similar size, similar starting material) gave values higher by 15° C. to 24° C. It can therefore be inferred that the addition of dry ice during maize ensilage considerably improves the fodder quality.

Example 3

Wilted silage was made from first-cut meadow grass in the vegetation stage of spikelet formation. The fodder was ensiled in a tower silo with a capacity of about 2300 m³ (height 21 m, diameter 12 m).

The test of fermentability according to Patent DD 281 255 - G01N 327 365 1 indicated that it was not necessary to add cultures of lactic acid bacteria. The content of fermentable substances was adequate for a dry-matter content of 30%. The dry-matter content of the silage material ranged from 38% to 69% and averaged 61%.

As the silage material was being loaded, dry ice was added continually from the beginning at a amount of 2 kg/t. In the top layer of the stack of fodder, which was ca. 2 m thick, the application amount was raised to 6 kg/t.

The dry ice was added by way of a dosing applicator mechanism of the tower silo. Blocks of dry ice with a mass of 10 kg were used. The blocks were fragmented by milling cylinders in the dosing applicator and transported into the tower silo along with the silage material by way of the ascending conveyor.

After a storage time of 8 months, the silage was fed to milk cows. The silage treated with dry ice was found to have a pleasantly mild odor, exhibited no signs of heating, was conspicuously light in color and was eaten very well by the animals.

I claim:

1. Method of ensiling fodder made from fresh or wilted silage material, which comprises subjecting said fodder to a homofermentative lactic acid fermentation, while adding solid carbon dioxide to the silage material in an amount of 0.5 to 20 kg per ton of fodder in a manner of distribution that an increased amount of carbon dioxide is added to the oxygen-endangered marginal and superficial zones, wherein the fermentation process is carried out with an amount of silage material large enough, so that the temperature of the silage material is substantially unchanged in relation to the ambient temperature.

2. Method according to claim 1, wherein the addition of solid carbon dioxide is combined with the addition of cultures of lactic acid bacteria.

3. Method according to claim 1, wherein the addition of solid carbon dioxide is combined with the addition of fermentable carbohydrates, in an amount of 1 to 30 kg per ton of fodder.

4. Method according to claim 1, wherein the addition of solid carbon dioxide is combined with the addition of a substance selected from the group consisting of:

an enzyme; and an enzyme complex.

5. Method according to claim 1, wherein the amount of solid carbon dioxide is in the range from 1 to 3.2 kg per ton of fodder.

6. Method according to claim 2, wherein the addition of solid carbon dioxide is combined with the addition of at least one fermentable carbohydrate, said carbohydrate in an amount of 1 to 30 kg per ton of fodder.

7. Method according to claim 6, wherein the carbohydrate is molasses.

8. Method of ensiling fodder made from fresh or wilted silage material, which comprises homofermentative lactic acid fermentation by addition of solid carbon dioxide to the silage material in an amount of 0.5 to 20 kg per ton of fodder in a manner of distribution that an increased amount of carbon dioxide is added to the oxygen-endangered marginal and superficial zones, wherein the fermentation process is carried out with an amount of silage material large enough, so that the temperature of the silage material is substantially unchanged in relation to the ambient temperature.

9. Method according to claim 8, wherein the addition of solid carbon dioxide is combined with the addition of cultures of lactic acid bacteria.

10. Method according to claim 8, wherein the addition of solid carbon dioxide is combined with the addition of fermentable carbohydrates, in an amount of 1 to 30 kg per ton.

11. Method according to claim 8, wherein the addition of solid carbon dioxide is combined with the addition of a substance selected from the group consisting of:

an enzyme; and
an enzyme complex.

12. Method according to claim 8, wherein the amount of solid carbon dioxide is in the range from 1 to 3.2 kg per ton of fodder.

13. Method of claim 9, wherein the addition of solid carbon dioxide is combined with the addition of at least one fermentable carbohydrate, said carbohydrate in an amount of 1 to 30 kg per ton of fodder.

14. Method according to claim 13, wherein the carbohydrate is molasses.

15. Method according to claim 8, wherein the amount of carbon dioxide is the higher, the closer to the parts of the silo endangered by exposure to oxygen in the air.

16. Method according to claim 15, wherein the carbon dioxide is added continuously at an amount of 2 kg per ton of fodder and the amount is increased in the top layer of the stack of fodder to an amount of 6 kg per ton of fodder.

17. Method according to claim 16, wherein the carbon dioxide is added continuously as the silo is being filled.

18. Method according to claim 1, wherein the amount of carbon dioxide is the higher, the closer to the parts of the silo endangered by exposure to oxygen in the air.

19. Method according to claim 18, wherein the carbon dioxide is added continuously at an amount of 2 kg per ton of fodder and the amount is increased in the top layer of the stack of fodder to an amount of 6 kg per ton of fodder.

20. Method according to claim 19, wherein the carbon dioxide is added continuously as the silo is being filled.

* * * * *